United States Patent [19]
Nakagawa et al.

[11] Patent Number: 5,204,852
[45] Date of Patent: Apr. 20, 1993

[54] OPTICAL DISC-LIKE RECODING MEDIUM AND MANUFACTURING METHOD THEREOF

[75] Inventors: Eiji Nakagawa, Yokosuka; Makoto Itonaga, Yokohama; Toshinori Kawanishi, Yokosuka, all of Japan

[73] Assignee: Victor Company of Japan, Ltd., Yokohama, Japan

[21] Appl. No.: 655,817

[22] Filed: Feb. 15, 1991

[30] Foreign Application Priority Data

Feb. 17, 1990 [JP] Japan ................... 2-36910
Sep. 30, 1990 [JP] Japan ............... 2-103106[U]
Nov. 9, 1990 [JP] Japan ................... 2-305524
Nov. 29, 1990 [JP] Japan ................... 2-331060

[51] Int. Cl.$^5$ ............................................. G11B 3/70
[52] U.S. Cl. ........................ 369/275.1; 369/275.4; 369/277
[58] Field of Search ............... 369/275.1, 275.2, 275.3, 369/275.4, 277, 278, 279, 283, 284, 286, 288

[56] References Cited

U.S. PATENT DOCUMENTS

| | | | |
|---|---|---|---|
| 4,375,088 | 2/1983 | de Haan et al. | 369/275.3 X |
| 4,423,502 | 12/1983 | Dil | 369/275.3 |
| 4,872,156 | 10/1989 | Steenbergen et al. | 369/275.1 |
| 4,940,618 | 7/1990 | Hamada et al. | 369/275.1 X |
| 4,959,822 | 9/1990 | Pasman et al. | 369/275.1 X |
| 5,040,165 | 8/1991 | Taii et al. | 369/275.4 |

FOREIGN PATENT DOCUMENTS

| | | | |
|---|---|---|---|
| 0038944 | 3/1984 | Japan | 369/275.4 |
| 2-42652 | 2/1990 | Japan . | |
| 2-132656 | 5/1990 | Japan . | |
| 2-132657 | 5/1990 | Japan . | |
| 2-185737 | 7/1990 | Japan . | |
| 0008152 | 1/1991 | Japan | 369/275.4 |

Primary Examiner—Eugene R. LaRoche
Assistant Examiner—Tan Nguyen
Attorney, Agent, or Firm—Pollock, VandeSande & Priddy

[57] ABSTRACT

An optical disc-like recording medium has on one surface of its transparent substrate a ROM region where a plurality of pits are formed in correspondence with a predetermined information signal, and a RAM region where a plurality of guide grooves for tracking are formed and where an information signal is capable of being recorded. The optical disc-like recording medium transparent substrate is formed with a recording film made of an organic material and arranged to have a light-absorbing effect. Its refractive index is varied in response to illumination of laser light with a predetermined wavelength. Further formed on the recording film is a reflection film made of a metal which reflects light incident thereon. The physical depth of the pits is arranged to be equal to the physical depth of the guide grooves. The optical depths of the pit and guide groove have predetermined values which result from adjusting the thicknesses of the respective portions of the recording film present on the pit and guide groove. The width of the pits is preferable to be greater than the width of the guide grooves by a predetermined value. Optical disks interchangeable with compact disks are thus easily produced.

7 Claims, 7 Drawing Sheets

OPTICAL DISC-LIKE RECODING MEDIUM AND MANUFACTURING METHOD THEREOF

BACKGROUND OF THE INVENTION

The presented invention relates generally to optical disc-like recording medium and more particularly to such an optical disc-like recording medium mixedly having thereon a read-only region, or a data-prerecorded region, (which will be referred hereinafter to as a ROM region) and a write-allowable region (which will be referred hereinafter to as a RAM region) and a method of manufacturing the optical disc-like recording medium.

In order to meet the recent requirement for recording information on a recording medium with a high density and reproducing the information therefrom, optical disc-like recording media such as an optical compact disk are being developed which are arranged such that an information signal is recorded by illuminating a light beam intensity-modulated in accordance with the information signal. For reproducing the information signal from the recording medium, an accurate trace of the information-recorded track is made under a tracking control technique, such as for example by a tracking error detection system using the so-called push-pull method. The compact disk comprises a train of pits with a depth determined in a specific relation to light whose wavelength is 780 nm, the pit train corresponding to the recording information signal. The signal surface of the compact disk is covered by a thin film made of an aluminum so that the reflection factor of the land portion of the compact disk becomes 70 to 90%. The reading of the information signal from the compact disk is made by illuminating a light spot whose wavelength is 780 nm. The reading of the information signal from the compact disk is effected by utilizing the fact that the intensity of the reflection light from the pit portion on the signal surface is less than the intensity of the reflection light from the land portion because of the interference of light occurring at the pit portion. For tracking control the tracking error information is detected from the asymmetry occurred in a reflected light spot when the light spot for reading trails off the pit train.

Like the widely used compact disks, an optical disc-like recording medium (which will be referred hereinafter as an optical disk) has been developed which is reproducible through a reproducing apparatus of compact disks. One example of an optical disk being interchangeable with a compact disk produced by a compact disk reproducing apparatus is the direct read after write optical disk (which will be referred hereinafter to as a write type optical disk) that has a reproduction-only region (ROM region) and a write-allowable region (RAM region), or only the RAM region. The interchangeability of the optical disk with the compact disk is required in order to satisfy predetermine reproducing conditions such as the reflection factor, modulation factor and tracking signal output in connection with the compact disk.

A description is given hereinbelow of the problems which arise when arranging the optical disk to satisfy the predetermined reproducing conditions. The standardized value of the reflection factor of the compact disk is required to be above 70% when viewed from the reading side in the case where a laser beam of 780 nm is radiated from the reading side. Since the reflection loss of about 8% occurs on the disk surface, the reflection factor on the metallic reflection film of the disk is required to be at least above 80% in order to keep the reflection factor at the reading side to above 70%. Generally, the aluminum reflection film of the compact disk is arranged so as to offer a reflection factor of above 80% which satisfies the condition on the reflection factor. However, for the write type optical disk, absorption of optical energy into the recording film occurs in recording. In addition, there is a guide groove for the tracking control in recording provided in the transparent substrate. Thus, there is also a loss of the light intensity due to the incident light being diffracted by the guide groove. Therefore, it is difficult to adjust the reflection factor at the reading side of the optical disk to the standardized value of the compact disk.

Secondly, to arrange the write type optical disk to be interchangeable with the compact disk which can satisfy the condition on the modulation factor of the high-frequency signal, there is the following problem. Although a compact disk can easily satisfy the standardized value of the modulation factor of a high-frequency signal because it is arranged to read the information signal by using diffraction of light to the pits thereon, the information recorded onto an optical disk is effected with hole-formation, phase-variation and other methods which allow the information signal to be read on the basis of variation of the reflection factor. Therefore, it is difficult for the conventional optical disk to satisfy the standardized value of the modulation factor of the high-frequency signal for a compact disk because the difference between the reflection factor of the land portion, i.e., the non-recorded portion, and the recorded portion (corresponding to the pit), formed due to the hole-formation or the phase-variation, is small. This is because the modulation factor of the high-frequency signal is small. In order to satisfy the standardized value of the modulation factor of the high-frequency signal for the compact disk, the optical disk is also required to have an arrangement to perform the reading of the information signal on the basis of the phase structure such that the reading of the information signal is effected with light diffraction due to the pit.

Furthermore, to arrange the optical disk to be interchangeable with the compact disk to satisfy the standardized value in terms of the output level of the tracking signal, the following problem arises. In the optical disk the output level of the tracking signal generally depends upon the phase structure determined in accordance with the configuration of the guide groove for the tracking control. In the case that the recording of information to the recording film is made by hole-formation, the hole causes turbulence of the phase structure, thereby making it difficult to obtain the tracking signal with a desired output level.

SUMMARY OF THE INVENTION

It is therefore an object of the present invention to provide an optical disk which is easily produced and which recording density is not lowered while concurrently being interchangeable with the compact disk.

Further objects of this invention include providing effective and adequate manufacturing methods of optical disks.

According to this invention, there is provided an optical disk having on one surface of its transparent substrate a ROM region where a plurality of pits are formed in advance in correspondence with a predetermined information signal to be recorded, and a RAM region where a plurality of guide grooves for tracking are formed and where an information signal is allowed to be recorded. The optical disk is on the entire surface of the transparent substrate equipped with a recording film made of an organic material and arranged so as to have a light-absorbing effect to vary its refractive index in response to illumination by laser light with a predetermined wavelength, and further on the recording film equipped with a reflection film made of a metal and arranged to reflect light incident thereon. The optical depth of each of the plurality of pits formed in the ROM region is arranged to be deeper than an optical depth of each of the plurality of guide grooves formed in the RAM region so that, under conditions that the information signal recorded in the RAM region is the same as the predetermined information signal recorded in advance in the ROM region and reproduction light incident on the ROM region is coincident in wavelength and intensity with reproduction light incident on the RAM region, a property of reflection light reflected from the ROM region is coincident with a property of reflection light reflected from the RAM region. Each of the plurality of pits formed in the ROM region has a rectangular cross section in a direction perpendicular to an information recording direction and each of the plurality of guide grooves formed in the RAM region has a triangular or rectangular cross section in the direction perpendicular to the information recording direction, and the depth of each of the plurality of pits in the ROM region is physically deeper than the depth of each of the plurality of guide grooves in said RAM region.

Further, according to this invention, there is provided an optical disk having on one surface of its transparent substrate a ROM region including a plurality of pits and a RAM region including a plurality of guide grooves. The optical disk is formed on the entire surface of the transparent substrate equipped with a recording film made of an organic material and arranged so as to have a light-absorbing effect to vary its refractive index in response to illumination by laser light with a predetermined wavelength. Further on the recording film there is a reflection film made of a metal arranged to reflect light incident thereon. The physical depth of each of the plurality of pits formed in the ROM region is arranged to be equal to a physical depth of each of the plurality of guide grooves formed in the RAM region, and the optical depths of the pit and the guide groove are arranged to predetermined values by adjusting the thicknesses of the portions of the recording film present on the pit and the guide groove, respectively. Preferably, the width of each of the plurality of pits is arranged to be greater, by a predetermined value, than the width of each of the plurality of guide grooves.

Still further, according to this invention, there is provided an optical disk having on one surface of its transparent substrate a ROM region including a plurality of pits corresponding to a predetermined information signal and a RAM region including a plurality of guide grooves for tracking. The optical disk is formed on the entire surface of the transparent substrate equipped with a recording film made of an organic material and arranged so as to have a light-absorbing effect to vary its refractive index in response to illumination by laser light with a predetermined wavelength. Further on the recording film there is a reflection film made of a metal arranged to reflect light incident thereon. Each of the plurality of pits formed in the ROM region has a rectangular cross section in a direction perpendicular to an information recording direction and each of the plurality of guide grooves formed in the RAM region has also a rectangular cross section in the direction perpendicular thereto, and the bottom surfaces of the pit and the guide groove are substantially placed on a plane parallel to the surface of the transparent substrate. Further, the optical depths of the pit and the guide groove are adjusted to predetermined values by adjusting the thicknesses of the portions of the recording film present on the pit and the guide groove. The RAM region is formed at a position lower, by a predetermined value, than the ROM region with respect to the plane including the bottom surfaces of the pits and the guide grooves.

In addition, according to this invention, there is provided a method of manufacturing an optical disk having on one surface of its transparent substrate a ROM region including a plurality of pits and a RAM region including a plurality of guide grooves for tracking. The optical disk is formed on the entire surface of the transparent substrate equipped with a recording film made of an organic material and arranged so as to have a light-absorbing effect to vary its refractive index in response to illumination by laser light with a predetermined wavelength. Further on the recording film there is a reflection film made of a metal and arranged to reflect light incident thereon. The method comprises the steps of: preparing a glass plate transparent with respect to light and integrally providing a photo-resist on the glass plate; illuminating portions of the photo-resist corresponding to the plurality of pits in the ROM region by means of a first laser light in accordance with the information signal to be recorded so that the portions thereof are exposed to said first laser light up to a first predetermined depth, thereby forming a first surface configuration for the ROM region including the plurality of pits; illuminating portions of the photo-resist corresponding to the plurality of guide grooves in the RAM region by means of a second laser light so that the portions thereof are exposed to the second laser light up to a second predetermined depth equal to the predetermined exposed depth of the portions in the ROM region; simultaneously with the illumination of the portions due to the second laser light, illuminating a surface of the photo-resist for the RAM region by means of a third laser light so that the surface thereof is exposed to the third laser light up to a third predetermined depth shallower than the first or second predetermined depth, thereby forming a second configuration for the RAM region including the plurality of guide grooves; producing a stamper on the basis of the first and second surface configurations formed, and forming the transparent substrate in accordance with the produced stamper; and providing the recording film on the formed transparent substrate and further the reflection film on the recording film.

Moreover, according to this invention, there is provided a method of manufacturing an optical disk having on one surface of its transparent substrate a ROM region including a plurality of pits and a RAM region including a plurality of guide grooves for tracking, each of the plurality of guide grooves having a triangular cross section in a direction perpendicular to an information signal recording direction. The optical disk is on the entire surface of said transparent substrate equipped with a recording film made of an organic material and arranged so as to have a light-absorbing effect to vary its refractive index in response to illumination by laser light with a predetermined wavelength. Further on said recording film there is a reflection film made of a metal and arranged to reflect light incident thereon. The method comprises the steps of: preparing a glass plate transparent with respect to light and integrally providing a photo-resist on said glass plate; illuminating portions of said photo-resist corresponding to said plurality of pits in said ROM region by means of laser light in accordance with said information signal to be recorded so that said portions thereof are exposed to said laser light up to a first predetermined depth, thereby forming a first surface configuration for said ROM region including said plurality of pits; illuminating portions of said photo-resist corresponding to said plurality of guide grooves in said RAM region by means of laser light so that said portions thereof are exposed to said second laser light up to a second predetermined depth, thereby forming a second surface configuration for said RAM including said plurality of guide grooves; applying an organic material onto said first and second surface configurations for said ROM region and said RAM region, thereby producing a stamper on the basis of the organic-material-applied first and second surface configurations to produce said transparent substrate; and providing said recording film on the produced transparent substrate and further said reflection film on the recording film.

BRIEF DESCRIPTION OF THE DRAWINGS

The objectives and features of the present invention will become more readily apparent from the following detailed description of the preferred embodiments taken in conjunction with the accompanying drawings in which.

DETAILED DESCRIPTION OF THE INVENTION

Figure 1:
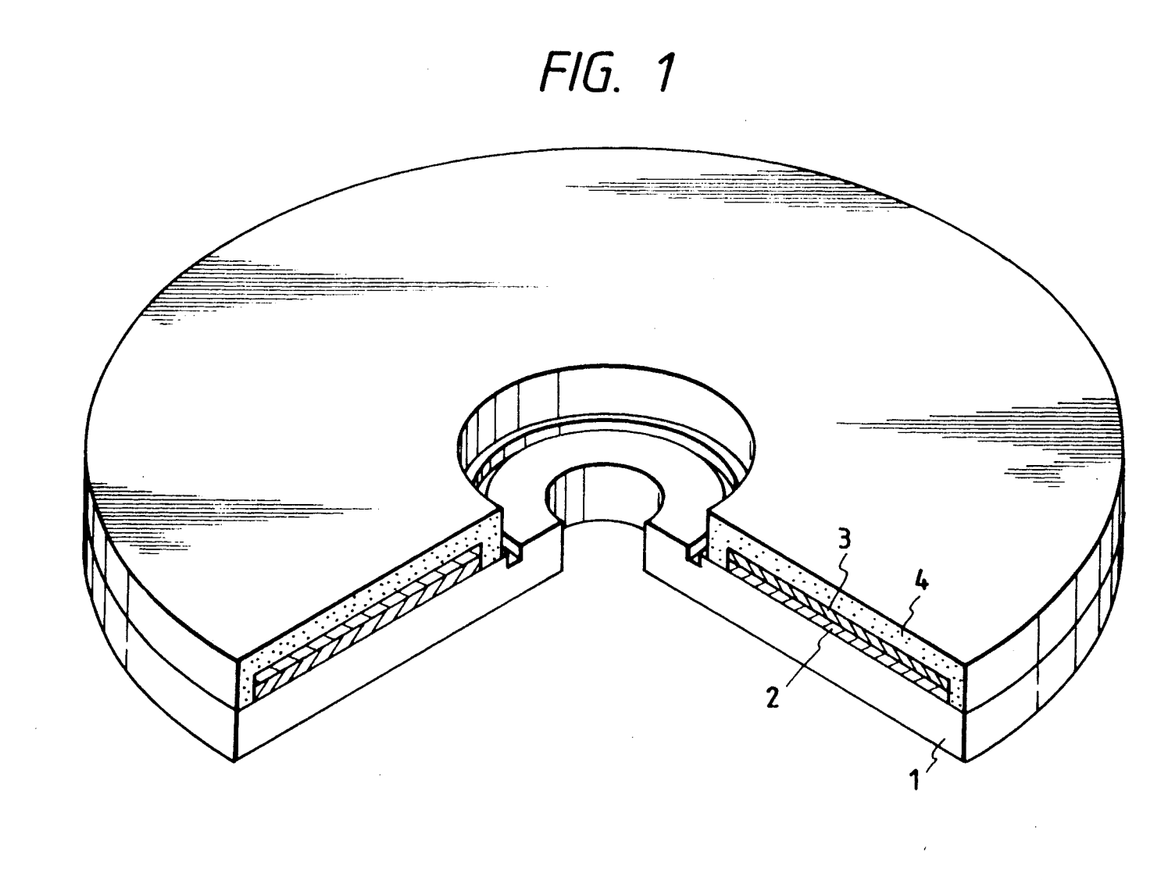
FIG. 1 is an illustration, partially broken away and in cross section, of an arrangement of an optical disk having a disc-like configuration and having therein A ROM region and A RAM region.
Figure 2:
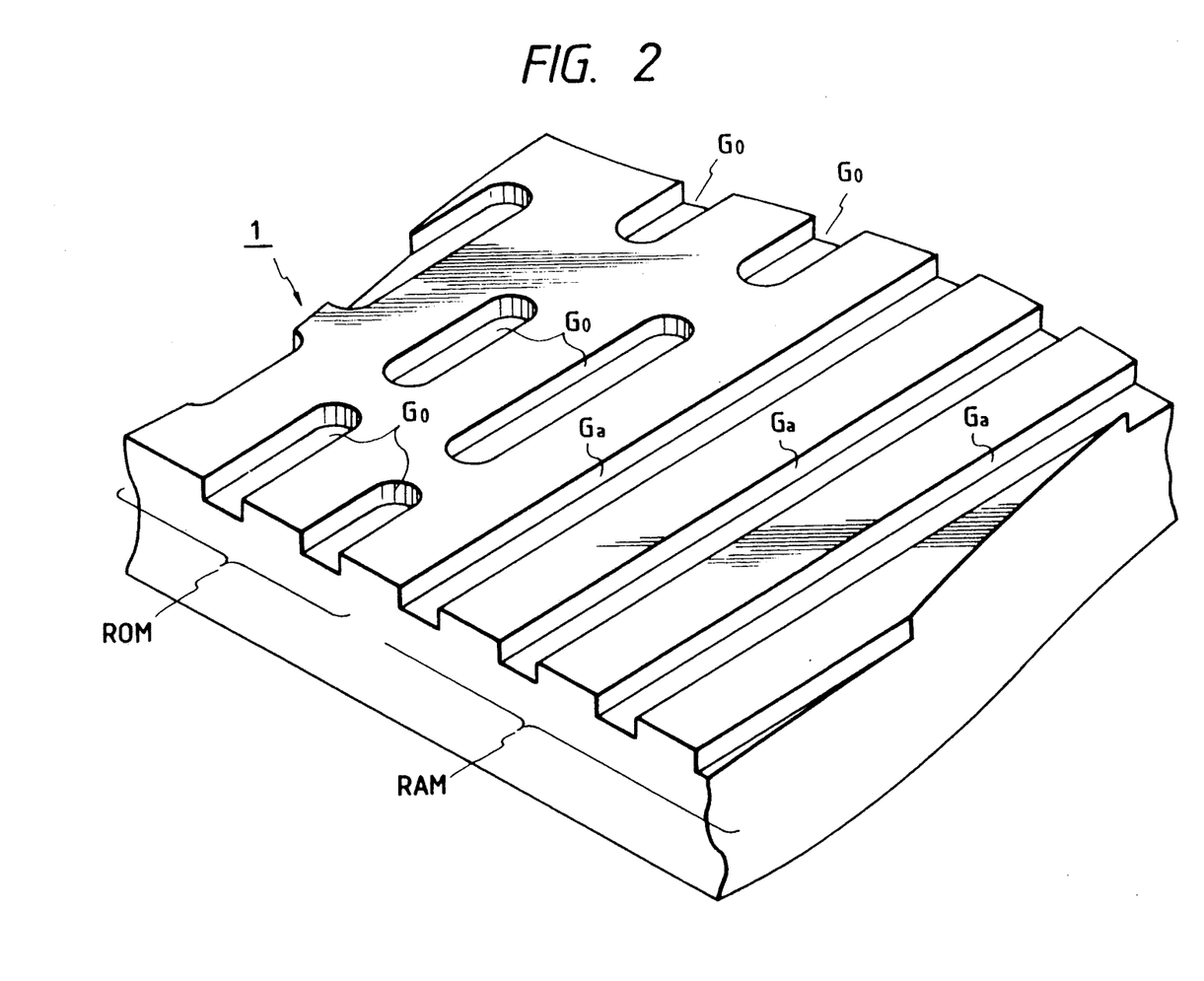
FIG. 2 is a partial illustration of a transparent substrate having therein a plurality of pits corresponding to an information signal and further having a plurality of guide grooves for tracking.

FIG. 1 is an illustration, partially broken away and in cross section, of an arrangement of an optical disk having a disc-like configuration. In FIG. 1, illustrated at numeral 1 is a transparent substrate of the optical disk which is made of a polycarbonate resin On the transparent substrate 1 there is provided a recording film 2 for allowing recording of an information signal, and on the recording film 2 there is provided a metallic film 3 for light reflection. Numeral 4 represents a protective layer or film for protecting the recording film 2 and the metallic film 3. As illustrated in FIG. 2, the transparent substrate 1 has a ROM region and a RAM region. In the ROM region there are formed a plurality of pits Go corresponding to the recorded information signal and in the RAM region there are formed a plurality of guide grooves Ga for the tracking control. The pits Go and the guide grooves Ga are formed so as to extend along the directions of the information tracks.

Figure 3:
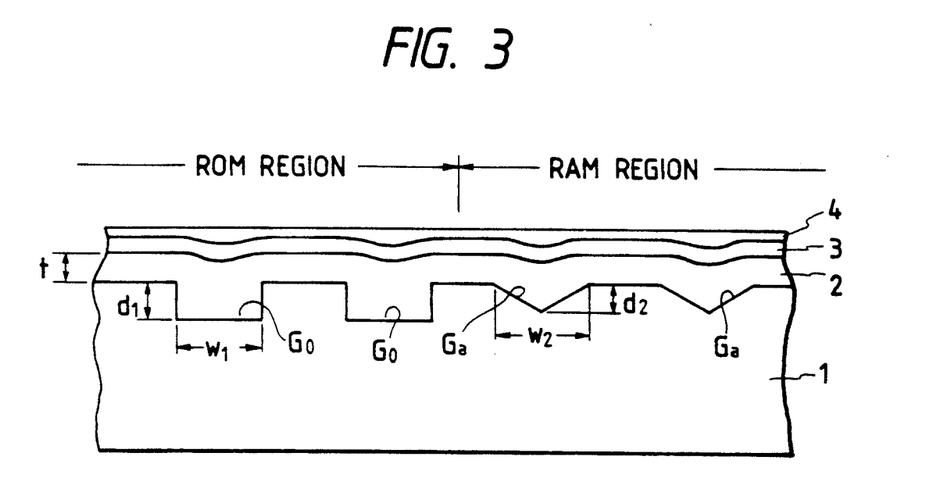
FIG. 3 is a partially cross-sectional view showing an arrangement of an optical disk according to a first embodiment of the present invention.
Figure 4:
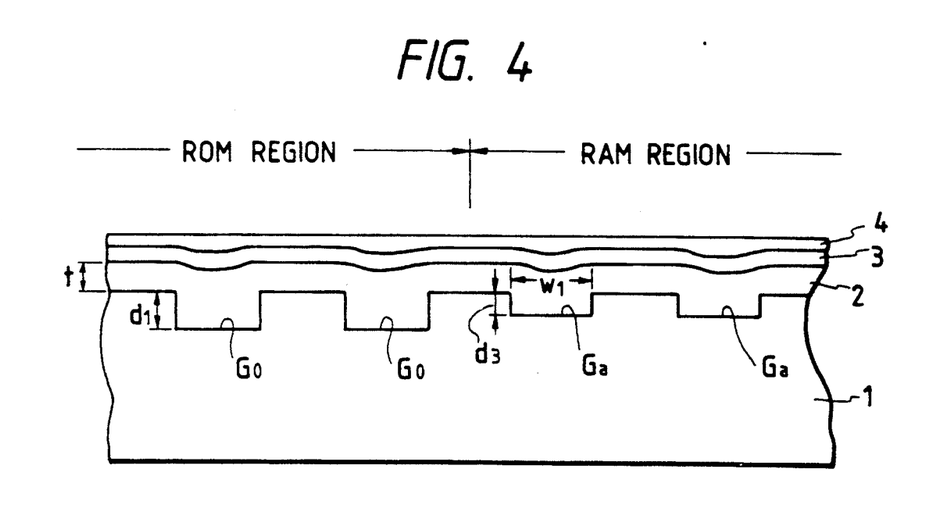
FIG. 4 is a partially cross-sectional view showing another arrangement of the optical disk according to the first embodiment of this invention.

Referring now to FIGS. 3 and 4, there are illustrated arrangements of optical disks interchangeable with compact disks according to an embodiment of the present invention, the optical disk being equipped with a ROM region and a RAM region. In FIG. 3, in the ROM region pits Go are formed in accordance with an information signal to be recorded in the ROM region so as to have a width of W1 and a depth of d1. Further, in the RAM region guide grooves Ga are arranged so as to have a width of W2 and a depth of d2. The pits Go and guide grooves Ga are formed to extend along the track of the optical disk. For example, the width W1 and depth d1 of a pit Go may be determined to be W1: 400 to 700 nm and d1: 80 to 150 nm, and the width W2 and depth d2 of a guide groove Ga may be determined to be W2: 500 to 1000 nm and d2: 40 to 90 nm. As illustrated in FIG. 3, the cross section of the pit Go taken in a direction perpendicular to the extending direction of the track is arranged to be substantially rectangular and the cross section of the guide groove taken in the same direction is arranged to be substantially triangular.

FIG. 4 is a cross-sectional view showing another arrangement of the optical disk according to the embodiment of the present invention where parts corresponding to those in FIG. 3 are marked with the same characters and numerals and the description omitted for brevity. One difference between the arrangement of the optical disk in FIG. 4 and the arrangement of the optical disk in FIG. 3 is that the cross section of the guide groove Ga formed in the RAM region has a rectangular configuration, and is arranged to have a width equal to the width W1 of the pit Go and depth of d3, which is 40 to 90 nm. The relation between the depth d1 of the pit Go and the depth d2 or d3 of the guide groove Ga can be determined such that d1 > d2 and d1 > d3.

FIGS. 3 and 4, on the entire surface of the transparent substrate 1 where the pits Go and the guide grooves Ga are formed, there is sealingly provided a recording film 2 made of an organic material. The recording film 2 may be provided on the entire surface of the transparent substrate 1 in accordance with the so-called spin coat technique. In response to incidence of recording laser light with a predetermined wavelength (for example, 780 nm), the recording film 2 has a characteristic to absorb the laser light by a predetermined amount so as to vary the refractive index. The thickness t of the recording film 2 on the substrate 1 is arranged to be 30 to 60 nm, for instance.

The organic material for the recording film 2 may be for instance, a heat-mode optical recording material (which is an organic coloring material or a material made by dispersing an organic coloring material in an organic material), a photon-mode optical recording material (which is an organic coloring material or a material made by dispersing an organic coloring material in an organic material), or an optical recording material operable by both the heat-mode and photon-mode (which is an organic coloring material or a material made by dispersing an organic coloring material in an organic material). Further, it is also possible to use a cyanin organic coloring material which has a refractive index n whose real number portion is +2.65 and whose imaginary number portion is −0.05.

Further, on the recording film 2 there is provided a metallic film 3 for light reflection which may be formed by means of deposition or sputtering. For the metallic film 3 there may be used a metal such as gold, aluminum, copper or the like which can offer a high reflection factor. In addition, on the metallic film 3 there is formed a protective film 4.

Here, both the RAM region and ROM region of the optical disk are required to be arranged to have the same phase structure as the compact disk so as to satisfy the predetermined conditions such as reflection factor, modulation factor of the high-frequency and output of the tracking signal in a reproduction mechanism based on the phase structure. In the optical disk illustrated in FIG. 3 or 4, because the recording film 2 made of an organic material is also present on the RAM region, the depth d1 of the pits formed in the ROM region is required to be at a depth which can compensate for the shift of the phase of the reproduction light due to the recording film 2. The depth d1 of the optical disk pit accordingly becomes different from the depth (110 nm) of the compact disk pit.

Now, assume the refractive index of the recording film 2 not illuminated by the recording light is n1 and the refractive index of the recording film 2 illuminated by the recording light is n2. Since the recording film 2 in the ROM region is not illuminated by the recording light, the refractive index of the recording film 2 in the ROM region is always maintained to be n1. On the other hand, the recording film 2 in the RAM region has a portion not illuminated by the recording light which has the refractive index n1, and a portion illuminated by the recording light which substantially has the refractive index n2.

The thickness of the recording film 2 that has the refractive index n1 which exists on the pit Go in the ROM region is determined to have an optical depth on the recording film 2, equal to the optical depth of the pit of the compact disk. Further, in the RAM region, the optical depth of the guide groove Ga on which the recording film 2 having the refractive index n1 is arranged to be substantially equal to the optical depth of the land portion of the compact disk. The optical depth of the guide groove Ga is additionally arranged to allow the tracking information to be obtained. Moreover, the optical depth of the guide groove Ga portion on which the recording film 2 having the refractive index n2 is required to be substantially equal to the optical depth of the pit Go portion on which the recording film 2 has the refractive index n1, i.e., the optical depth of the pit portion of the compact disk. These requirements can easily be realized by adequately determining the thickness of the recording film 2 existing at the guide groove Ga portion and further by using, for the recording film 2, an organic material showing a predetermined refractive index variation characteristic.

To set the optical depths in the ROM region and RAM region portions of the optical disk, the cross-sectional configuration of the guide groove Ga not only has to be triangular, as illustrated in FIG. 3, but also rectangular. Although in the above description the relation between the pit depth d1 and the guide groove depth d2 or d3 is arranged to be d1>d2 and d1>d3, in this embodiment the limitation that the optical depths of the respective portions in the RAM and ROM regions are set to adequate values is not imposed upon the relation.

A description will be made hereinbelow with reference to FIGS. 5 to 7 in terms of an optical disk according to a second embodiment of this invention. This embodiment takes into account the fact that because the depth d1 of the pit Go in the ROM region is different from the depth d4 (corresponding to the depth d2 or d3) of the guide groove Ga in the RAM region in the first embodiment, the adjustment of the depth d1 of the pit Go is difficult in the mastering process. This in turn makes it difficult to set the conditions for the formation of the pits Go and the guide grooves Ga.

One feature of the second embodiment is that in manufacturing the optical disk, each of the guide grooves Ga is formed to have a cross section with a rectangular configuration, and the depth d1 of the pits Go in the ROM region is arranged to be equal to the depth d4 of the guide grooves Ga in the RAM region. In other words, the optical depths of t-he pit Go and guide groove Ga are arranged to be different from each other with the physical depth of the pit Go being equal to the physical depth of the guide groove Ga.

As described above, in order to produce interchangeability between the optical disk and the compact disk, it is required for the optical disk to satisfy the predetermined conditions such as the reflection factor of the reading light, and the light modulation factor of the reading light due to the pit and the tracking error modulation factor. The reflection factor depends upon the reflection factor of the metallic film 3 and the light absorbing characteristic of the disk material, and the light modulation factor and tracking error modulation factor depend upon the optical path difference between the reading lights on the pit portion and pit-absent portion. The optical path difference where the light modulation factor becomes maximum is odd times of $\frac{1}{2}$ of the wavelength of the reading light and the optical path difference where the tracking error modulation factor becomes maximum is odd times of $\frac{1}{4}$ of the wavelength of the reading light. In the reproduction of the read-only compact disk where the information signal is recorded with geometric pits successively arranged, laser light whose wavelength is 780 nm is microscopically focused on the optical disk, and the discrimination of the pit is made by using the fact that the light intensity of the reflection light from the pit portion becomes less than the light intensity of the reflection light from the land portion, thereby obtaining a desired information signal. The polycarbonate which is the material for the transparent substrate 1 has a refractive index of about 1.5 and the semiconductor laser light whose wavelength is 780 nm is used as the laser light for reading. When the optical path difference between the pit portion and the land portion is $\lambda/2$ ($\lambda$ is the wavelength of the reading light), the phases of both the lights for the pit portion and the land portion cancel each other so that the difference in the light intensity of the reflection between the pit portion and the land portion becomes maximum, that is, the modulation factor becomes maximum. In order that the optical path difference becomes $\lambda/2$, the depth of the pit can be reduced to half, i.e., $\lambda/4$. In the resin (the transparent substrate 1) having the refractive index of 1.5, $\lambda/4$ corresponds to the depth of about 140 nm. However, this depth allows the modulation factor to become maximum but makes it difficult to perform the tracking control because of no reflection light at the pit portion. In practice, a value slightly shifted from $\lambda/4$ (substantially corresponding to $\lambda/(4n)$ where n is a refractive index) is taken as shown by A and B in FIG. 6 to obtain the reflection light from the pit portion to allow tracking control.

The tracking guide groove on the recording-allowable optical disk is a continuous groove, and error detection is effected by using the fact that the intensity distribution of the reflection light is shifted in accordance with the tracking error. Generally, well-known detecting methods such as the so-called push-pull method and three-beam method are used therefor. In the case that the recording/reproduction is performed under the tracking control operation, the optimal value of the depth of the guide groove is $\lambda/8$ (half the depth of the pit). However, $\lambda/8$ causes the tracking output to become extremely large, such that position A or C in FIG. 6 is used. The value corresponding to position B in FIG. 6 cannot be used because of the phase reversal. If the reflection factor is taken into account, position C is preferable. The provision of the recording layer causes phase lag to position D in FIG. 6 (E and F in FIG. 6 represent the reverse phase).

According to this embodiment, the ROM region and the RAM region are formed in the same substrate (transparent substrate 1) so as to have the same physical depth, that is, the physical depth of the pit is arranged to be equal to the physical depth of the guide groove. The reason is as follows. First, the recording layer is provided over the entire substrate. In the case that the layer having a different refractive index is provided on the pit and the reflection layer (metallic film 3) is further provided thereon, the reflection light intensity depends upon the depth of the pit and the thickness of the recording layer so as to behave in a periodic functional manner. This same is true of the guide groove. Thus, the respective optimal depths of the pit and the guide groove depend upon the thickness of the recording layer. As a result, in the case that the thickness of the recording layer on the pit is different from the thickness of the recording layer on the guide groove, even if the depths of the pit and guide groove are equal to each other, optical difference occurs.

The recording layer is provided by means of the spin coat technique, while the pit portion and guide groove portion are different from each other in terms of the behavior of the flow of liquid on the substrate. Because of the presence of the flat portion, the pit portion provides easier flow as compared with the guide groove portion. In addition, one of the pit and guide grooves which has a narrower width provides easier flow as compared with another. With these two points, as shown in FIG. 5, the space in the guide groove is arranged to be more occupied by the recording layer than those of the pit and the recording layer provided on the substrate. This arrangement ensures that, after the provision of the recording layer, the optical depths be different from each other even if the physical depths are equal. Accordingly, in the ROM region it is possible to effect the pit depth and the recording layer thickness to obtain a CD signal after the provision of the recording layer. In the RAM region it is also possible to obtain a desired reproduction characteristic after the provision of the recording layer. More specifically, in the pit portion the optical difference is taken as indicated by A in FIG. 6; and in the guide groove portion, the optical path difference is taken as indicated by C or D in FIG. 6 with the thickness of the recording layer being varied on the guide groove. The refractive index of the recording layer can be as large as about 2.5 and hence the difference in thickness therebetween optically varies greatly.

Figure 5:
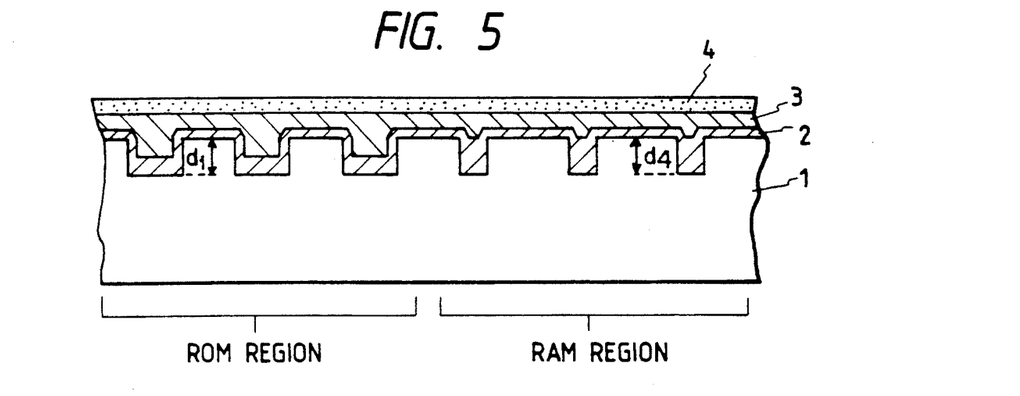
FIG. 5 is a partially cross-sectional view showing an arrangement of an optical disk according to a second embodiment of this invention.
Figure 6:
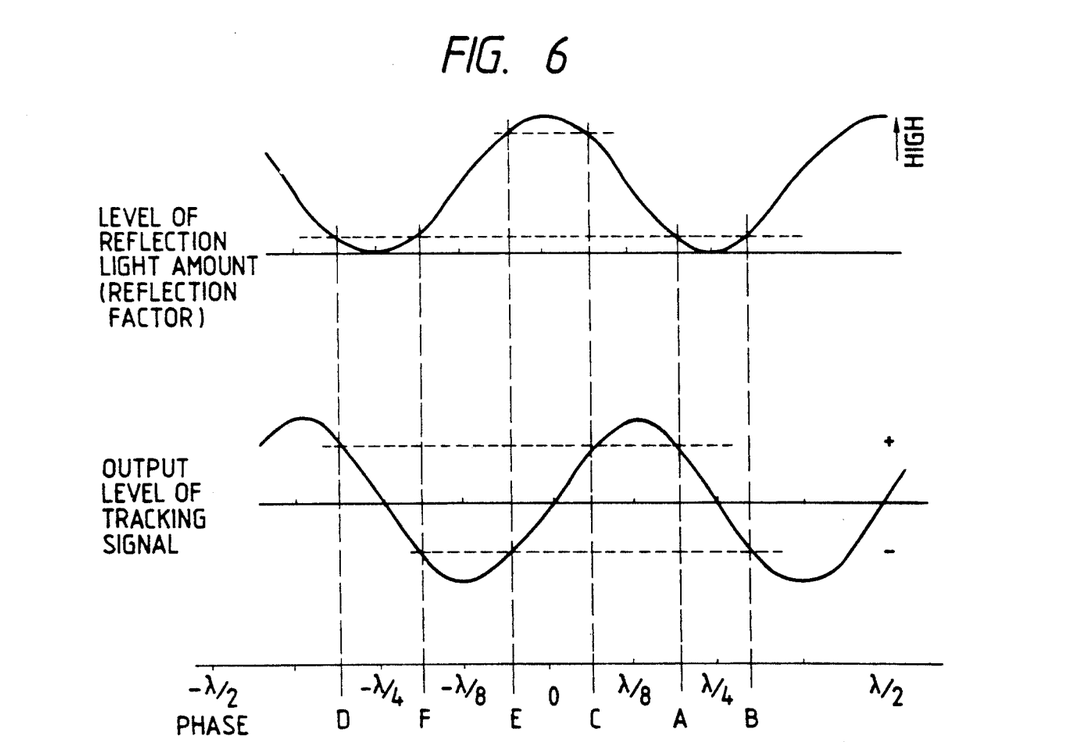
FIG. 6 is a graphic illustration of reflection factor and tracking signal output level.

In FIG. 5, the ROM region (corresponding to the radius of 25 to 35 mm in FIG. 1) of the transparent substrate 1 has a plurality of pits Go having a depth of 110 nm formed in correspondence with the information signal. The RAM region (corresponding to the radius of 35 to 58 mm in FIG. 1) has a plurality of guide grooves Ga formed to have a depth of 110 nm, a width of 0.5 $\mu$m and a pitch of 1.6 $\mu$m. As illustrated in FIG. 5, the width of the pit Go is arranged to be greater than the width (0.5 $\mu$m) of the guide groove Ga.

Figure 7:
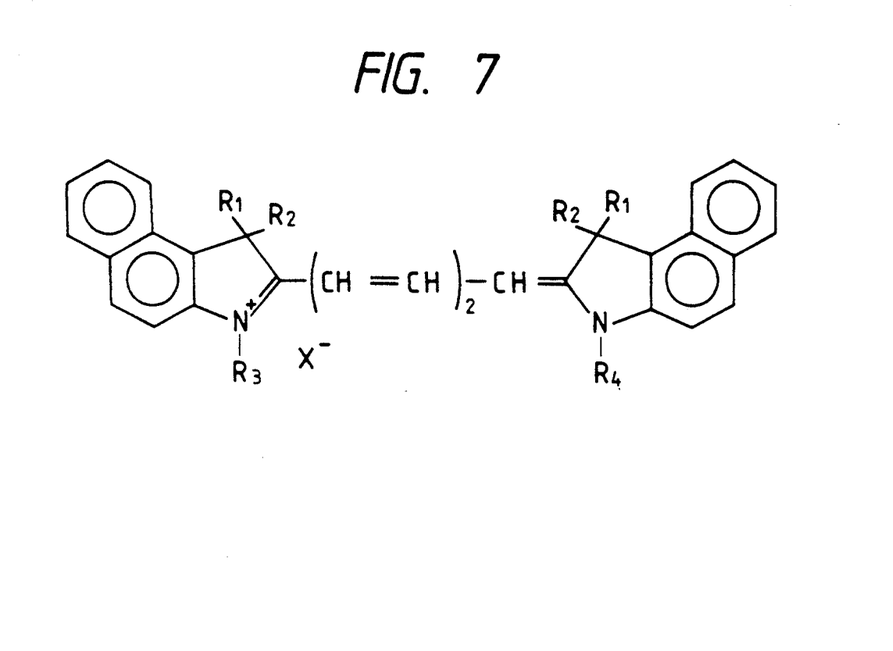
FIG. 7 is an illustration of an organic material used for a recording film of the optical disk according to the present invention.

On the substrate 1 there is provided a recording film 2 which can be made using an indorenin cyanin coloring material as illustrated in FIG. 7. In FIG. 7, $R_1$ and $R_2$ of the cation represent one of $CH_3$— and $C_2H_5$—, $R_3$ and $R_4$ are the alkyl group of $C_1$ to $C_5$ ($R_3=R_4$, $R_3$ not equal to $R_4$), and $X^-$ represents anion. The indorenin cyanin coloring material is dissolved in a cellosolve solvent with weight concentration of 6% to prepare the coat solution for the recording film 2. For the formation of the recording film 2 on the transparent substrate 1, the coat solution is applied onto the entire surface of the transparent of 1500 to 3500 rpm.

After drying the recording film 2, the reflection film (metallic film) 3 is formed on the recording film 2 by magnetron sputtering to have a thickness of 50 to 70 nm. Further, a protective film 4 is formed on the metallic film 3. In this case, the metallic film 3 is coated with an ultraviolet-hardened resin so that the thickness of the resin becomes 2 to 5 $\mu$m, before it is hardened by illumination of ultraviolet. Here, if the inner and outer circumferential portions of the recording film 2 are arranged to come into contact with the protective film 4, the protective film 4 is formed with the recording film 2 and reaches the transparent substrate 1 so as to cover the side portions of the recording film and metallic film 3 concurrently with the entire metallic film 3. Thus, there is excellent adhesion between the transparent substrate 1 and the protective film 3.

According to tests, the ROM region of the optical disk can be played directly by a general CD (compact disk) player. In this case, the reproduced signal satisfies the standard for compact disks in terms of Cl error rate, symmetry, modulation factor and others. Further, when the recording of an EFM signal in the RAM region is performed with laser light of wavelength 780 nm and recording power of 7 to 9 mW, the CD player is able to reproduce from the RAM region as well as the ROM region.

Here, it is also appropriate that the depths of the pit Go and the guide groove Ga are arranged to be 115 nm. A good result is obtained from this arrangement, as well as the above-described arrangement. Further, although in the above description the depth of the pit or guide groove is 110 or 115 nm, the interchangeability with the compact disk can be adequately ensured when the depth is in a range of 110 to 180 nm.

Figure 8:
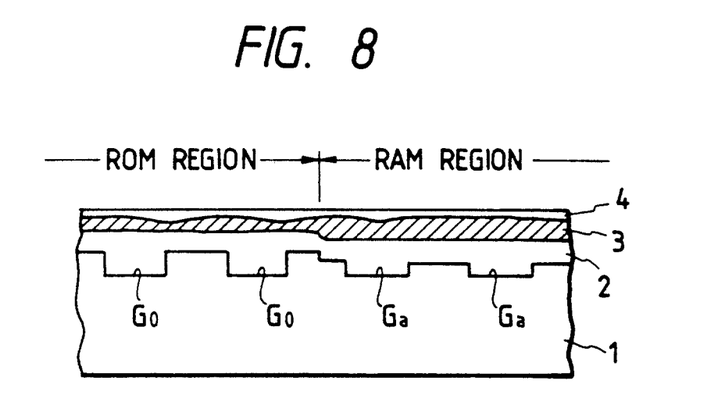
FIG. 8 is a partially cross-sectional view showing an arrangement of an optical disk according to a third embodiment of this invention.

FIG. 8 is a partial cross-sectional view showing an arrangement of an optical disk according to a third embodiment of this invention. This embodiment allows easy production of the optical disk and concurrently improves the reliability of the optical disk. In FIG. 8, illustrated at numeral 1 is a transparent substrate made of a polycarbonate and arranged to have a diameter of 120 mm. On the principal surface of the transparent substrate 1 there is disposed a ROM region corresponding to the range of 25 to 37 mm in diameter where pits Go are formed in correspondence with an information signal so as to have a width of 400 to 700 nm and a depth of 80 to 150 nm. There is also disposed a RAM region corresponding to the range of 37 to 59 mm in diameter where guide grooves Ga are formed to have a width of 400 to 700 nm and a depth of 40 to 90 nm. As shown in FIG. 8, the cross-sections of the pit Go and the guide groove Ga are perpendicular in the track-extending direction and are rectangular. On both the ROM and RAM regions of the transparent substrate 1 there is provided a recording film 2 which has a thickness of 30 to 60 nm. The recording film 2 characteristically permits its refractive index to vary by illumination of laser light having a predetermined wavelength (in this case, 780 nm). This recording film 2 can be made from a heat-mode optical recording material (which is an organic coloring material or a material made by dispersing an organic coloring material in an organic material), a photon-mode optical recording material (which is an organic coloring material or a material made by dispersing an organic coloring material in an organic material), and an optical recording material operable by both the heat-mode and photon-mode (which is an organic coloring material or a material made by dispersing an organic coloring material in an organic material). In this embodiment, an indorenin cyanin coloring material is used therefor. On the recording film 2 a metallic film 3 for reflection of light is formed in accordance with the deposition or sputtering technique. Materials for the metallic films may include gold, copper, and aluminum which can provide a high reflection factor. Further, on the metallic film 3 there is disposed protective layer 4 which is for protection against humidity, dust and others.

When the refractive index of the recording film 2, taken in the case where laser light 11 is not used for recording illumination and the reflection factor of the recording film 2, taken in the case where laser light 12 is used for the recording illumination, the refractive index of the recording film 2 in the ROM region is always n1 because of no illumination by the recording light. In order to equalize the optical depth of the pit Go portion of the optical disk to the optical depth (110 nm) of the pit portion of the compact disk, the depth of the pit Go is arranged to be 130 nm taking into account the fact that the refractive index of the recording film 2 is n1. On the other hand, in the RAM region the refractive index of the recording film 2 on the guide groove Ga is n2, and therefore the optical depth of the guide groove Ga is determined to be 50 nm.

Figure 9A:
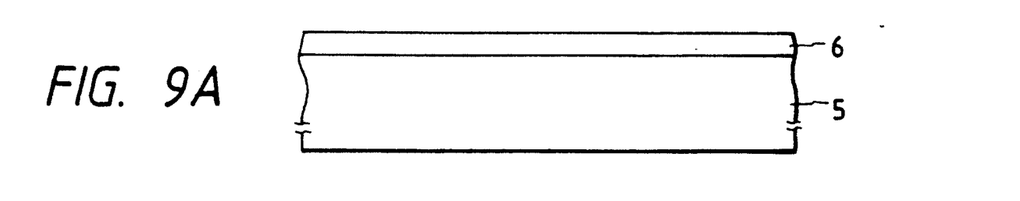
FIGS. 9A to 9F are illustrations useful for describing a manufacturing method of the optical disk, illustrated in FIG. 8, according to a fourth embodiment of this invention.
Figure 9B:
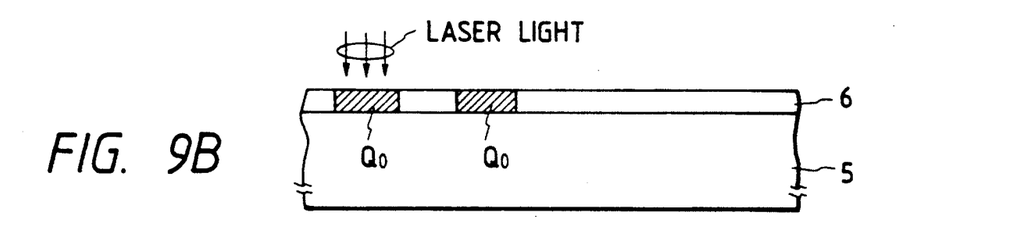
Figure 9C:
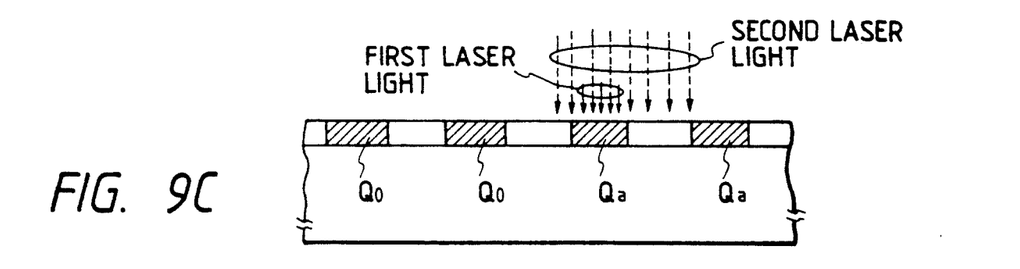

Secondly, a description will be made hereinbelow in terms of a method of manufacturing the optical disk with reference to FIGS. 9A to 9F. First, a glass plate is prepared and cut to have a desired shape, then ground to produce a glass disc 5. On the glass disc 5, a photo-resist 6 having a thickness of 130 nm is formed in accordance with the spin coat technique as illustrated in FIG. 9A. Next, portions (corresponding to pits) in a predetermined area (the inner circumferential portion from 25 to 37 mm in diameter, i.e., the ROM region) of the photo-resist 6 are successively exposed to a gas laser beam with a focused cross-section having a configuration corresponding to a pit to be formed or recorded. A number of exposed portions indicated by Qo in FIG. 9B are realized in the predetermined area of the photo-resist 6. The gas laser beam exposes the photo-resist 6 to a thickness (130 nm) and each of the exposed portions Qo has a rectangular cross section as indicated by oblique lines in FIG. 9B. Further, portions in the outer circumferential area (37 to 59 mm in radius, i.e., the RAM region) of the photo-resist 6 are exposed to a first laser beam. Due to the first laser beam, the exposed portions Qa are formed in the outer circumferential area so as to have a configuration corresponding to the guide groove as illustrated in FIG. 9C. Simultaneously with the illumination of the first laser beam, a second laser beam illuminates the outer circumferential area of the photo-resist 6 over a predetermined range including the portions exposed to the first laser beam. In this case, the exposure due to the second laser beam is limited to a predetermined depth of the photo-resist 6 with the laser output being adequately adjusted. In FIG. 9C, a portion indicated by a dotted line corresponds to the portion exposed to the second laser beam. As a result, the RAM region can be formed at a position lower by a predetermined value than the ROM region with respect to a plane which includes the bottom surfaces of the pits and the guide grooves.

Figure 9D:
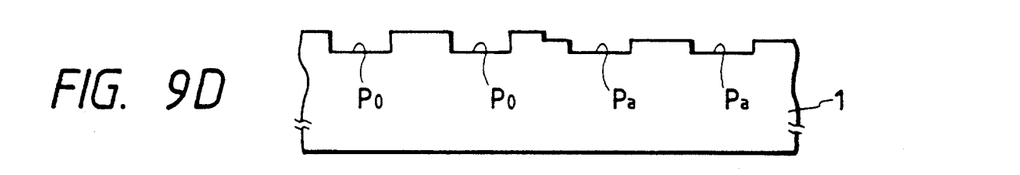
Figure 9E:
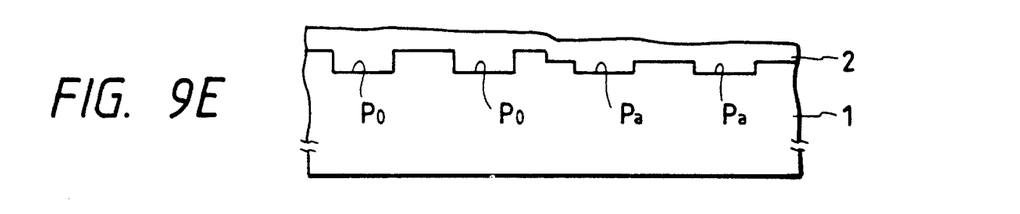
Figure 9F:
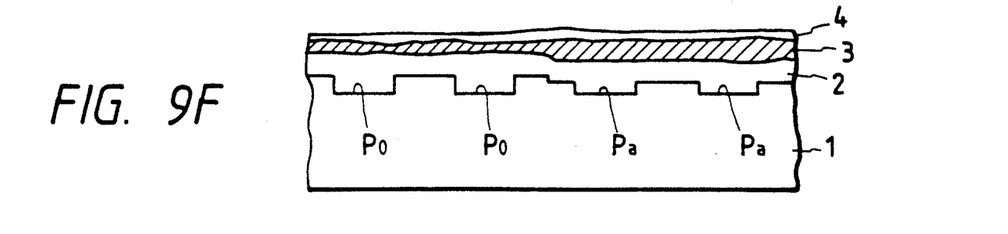

Thereafter, a well-known development is effected for the disc having the laser-exposed photo-resist 6. A nickel film is formed in accordance with the sputtering method, as well as the formation of a compact disk thickened by means of wet plating, thereby producing a stamper. By using the stamper, a polycarbonate is shaped to a desired configuration in accordance with the injection molding technique, thereby producing a polycarbonate substrate 1 as illustrated in FIG. 9D. After the production of the polycarbonate substrate 1, the entire surface of the polycarbonate substrate 1 is spin-coated with a liquid made by dissolving an indorenin cyanin coloring material into a polar alcohol solvent such as cellosolve and diacetone alcohol (2 to 8 weight percent), thereby producing a recording film 2 as illustrated in FIG. 9E. On the recording film 2, a gold film is formed in accordance with the sputtering technique and a protective layer 4 is further formed in accordance with the sputtering technique so as to produce an optical disk according to the present invention as illustrated in FIG. 9F. When an information signal is recorded in the optical disk and then reproduced therefrom, it has been found that the reproduced information signal satisfies the standard for the compact disk.

In the optical disk according to this embodiment, because there is no recording-unallowable area (in which an information signal cannot be recorded) between the ROM region and the RAM region, concurrently with improving the recording density, it is possible to freely dispose the RAM region and the ROM region. Moreover, according to the above-described manufacturing method, it is possible to easily control the shape and depth of the guide groove Pa in the RAM region.

Although the above-described embodiment optical disk has a single ROM region and a single RAM region, it is also possible to form a plurality of ROM regions on an optical disk. For example, for forming on one optical disk a plurality of ROM regions accommodated to lights with different wavelengths, the plurality of ROM regions whose optical depths are different from each other can be formed at desired positions of the optical disk in accordance with the above-described manufacturing method. In addition, this manufacturing method is not only limited to optical disks but is also applicable to a card-like medium.

A description will be made hereinbelow with reference to FIGS. 10, 11A and 11B in terms of a method of manufacturing an optical disk according to a further embodiment of the present invention. This embodiment is for easily and adequately manufacturing an optical disk mixedly having a ROM region where a plurality of pits each having a rectangular cross section are disposed and a RAM region where a plurality of guide grooves each having a triangular cross section are formed as illustrated in FIG. 3. Generally, for the formation of the guide groove having the triangular cross-section, edge portions of the guide groove tend to becomes rough and the rough edge portions cause generation of jitters, errors and the like after recording. In this embodiment, the optical disk illustrated in FIG. 3 has the following arrangement. The transparent substrate 1 is made of a polycarbonate resin and is arranged to have a diameter 120 mm. In the ROM region of 25 to 35 mm in radius a plurality of CD-ROM signal pits Go each having a depth 130 nm are formed in accordance with an information signal. In the RAM region of 35 to 58 mm in radius a plurality of absolute-time-modulated tracking V-shaped guide grooves Ga are formed with wobbling whose amplitude is 30 nm so as to have a depth of 55 nm, a width of 0.5 μm and a pitch of 1.6 lμm. On the entire surface of the transparent substrate 1 having thereon the RAM region and the ROM region, there is formed the recording film 2 made of an organic material so that its refractive index varies by absorbing a predetermined amount of light in response to illumination of laser light having a predetermined wavelength (for example, 780 nm). The recording film 2 can be provided thereon in accordance with the spin coat technique. As the organic material for the recording film 2 an indorenin cyanin coloring material is used. To attach the indorenin cyanin coloring material onto the transparent substrate 1, the indorenin cyanin coloring material is dissolved in diacetone alcohol with 6 weight percent, and dropped at the inner side of the transparent substrate with the transparent substrate 1 being rotated at 1500 to 3000 rpm. A recording film 2, having a thickness of 50 to 200 nm on the transparent substrate 1 is formed. After the recording film 2 is dried, a metallic film 3 having a thickness of 50 to 70 nm is formed thereon in accordance with the deposition or sputtering technique. On the metallic film 3 there is provided the protective layer 4 having a thickness of 2 to 5 μm. Similar to the optical disks of the above-described embodiments, this optical disk offers excellent result in terms of interchangeability with the compact disk.

Figure 10:
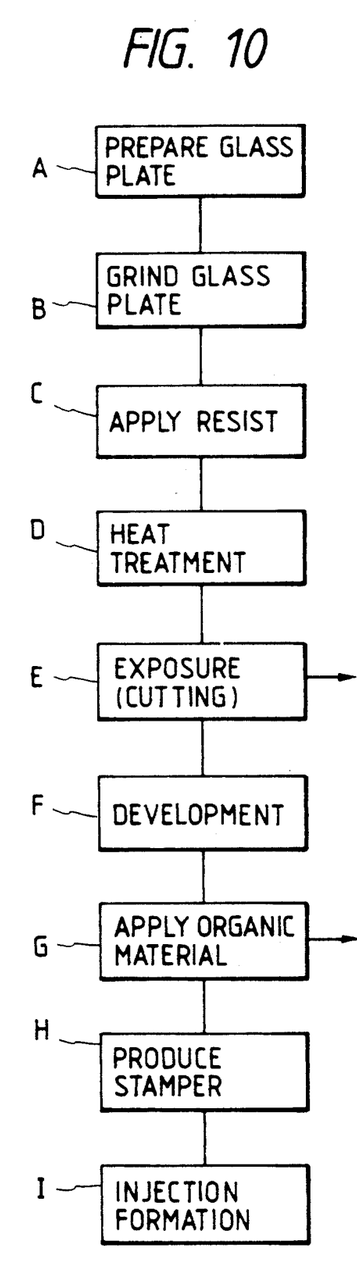
FIGS. 10, 11A and 11B are illustrations for describing a manufacturing method of an optical disk according to a fifth embodiment of this invention.
Figure 11A:
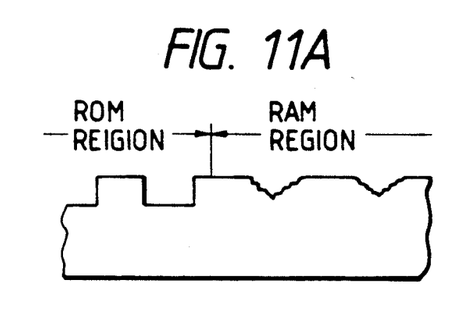
Figure 11B:
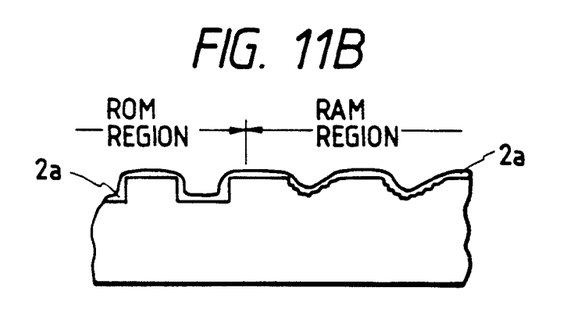

FIG. 10 is a flow chart showing the method of manufacturing the optical disk having the aforementioned arrangement. In FIG. 10, a glass plate is ground in steps A and B to smooth the entire surface for application of a photo-resist. In step C a photo-resist is applied on the smoothed glass surface to have a thickness of 150 nm in accordance with the spin coat technique. Thereafter, a step D heat-treatment is effected to fixedly secure the recording film onto the glass plate. Step E is then executed to focus laser light emitted from a gas laser device (for example) by means of a light modulator (not shown) and intensity-modulate the focused laser light in accordance with an information signal to expose (cut) pits in the ROM region and further to expose (cut) V-shaped guide grooves in the RAM region, thereby obtaining a cross section as illustrated in FIG. 11A. For instance, the depth of the pits is set to be 115 to 180 nm (for example, 150 nm in this embodiment) and the depth of the V-shaped guide grooves is set to be 80 nm. In a subsequent step F, pits are formed in the ROM region and guide grooves in the RAM region. An organic material 2a is applied over both the ROM and RAM regions as illustrated in FIG. 11B in step G. Here, the depth of the guide grooves in the RAM region is arranged to be 40 to 110 nm (80 nm in this embodiment) and a lean polyvinyl alcohol aqueous solution of below 0.5% concentration is used as the organic material 2a. The reason that the organic material is applied over the entire surface of the glass substrate having the irregular configuration is that interchangeability with the compact disk requires the depth of the guide grooves determined by taking into account the reflection factor and others. Thereafter, a step H is executed to perform predetermined processes such as surface conduction process to produce a predetermined stamper. Step I performs the injection formation on the basis of the produced stamper to produce a transparent substrate (1), before providing the recording film on the transparent substrate and further the metallic film on the recording film. In the aforementioned manufacturing processes, the application of the lean organic material smooths the edge portions of the guide grooves to allow adequate execution of the spin coat method for the application of the recording film on the glass substrate. Hence, in the case of the lean organic material not being applied on the glass substrate in step G, it is impossible to adequately reproduce the recorded information signal from the RAM region.

It should be understood that the foregoing relates to preferred embodiments of the present invention, and that it is intended to cover all changes and modifications of the embodiments of the invention herein used for the purposes of the disclosure, which do not constitute departures from the spirit and scope of the invention.

What is claimed is:

1. An optical disc-like recording medium having on one surface of its transparent substrate a ROM region where a plurality of pits are previously formed in correspondence with a predetermined to be recorded information signal and a RAM region where a plurality of guide grooves for tracking are formed and an information signal can be recorded, a recording film being provided on the entire surface of said transparent substrate, said recording film being made of an organic material and arranged to have a light-absorbing effect to vary its refractive index in response to illumination of laser light with a predetermined wavelength, said recording film having provided thereon a reflection film made of a metal and arranged to reflect light incident thereon, each of said plurality of pits and each of said plurality of guide grooves having respective optical depths defined by respective products of the physical depth and refractive index for each of said plurality of pits and each of said plurality of guide grooves such that said optical depth of each of said plurality of pits formed in said ROM region is arranged to be deeper than said optical depth of each of said plurality of guide grooves formed in said RAM region such that, when the information signal recorded in said RAM region is the same as said predetermined information signal previously recorded in said ROM region and the reproduction light incident on said ROM region is coincident in wavelength and intensity with the reproduction light incident on said RAM region, a property of the reflection light reflected from said ROM region is conincident with a property of the reflection light reflected from said RAM region.

2. An optical disc-like recording medium as claimed in claim 1, wherein each of said plurality of pits formed in said ROM region has a rectangular cross section and each of said plurality of guide grooves formed in said RAM region has a triangular cross section each of said plurality of pits in said ROM region and said plurality of guide groove in said RAM region having a physical depth, the depth of each of said plurality of pits in said ROM region being physically deeper than the depth of each of said plurality of guide grooves in said RAM region.

3. An optical disc-like recording medium as claimed in claim 1, wherein each of said plurality of pits formed in said ROM region has a rectangular cross section and each of said plurality of guide grooves formed in said RAM region has a rectangular cross section each of said plurality of pits in said ROM region and said plurality of guide grooves in said RAM region having a physical depth, the depth of each of said plurality of pits in said ROM region being physically deeper than the depth of each of said plurality of guide grooves in said RAM region.

4. An optical disc-like recording medium having on one surface of its transparent substrate a ROM region where a plurality of pits are previously formed in correspondence with a predetermined to be recorded information signal and a RAM region where a plurality of guide grooves for tracking are formed and an information signal can be recorded, a recording film being provided on the entire surface of said transparent substrate, said recording film being made of an organic material and arranged to have a light-absorbing effect to vary its refractive index in response to illumination of laser light with a predetermined wavelength, said recording film having provided thereon a reflection film made of a metal and arranged to reflect light incident thereon, a physical depth of each of said plurality of pits formed in said ROM region being arranged to be equal to a physical depth of each of said plurality of guide grooves formed in said RAM region, each of said plurality of pits and each of said plurality of guide grooves having respective optical depths defined by respective products of the physical depth and refractive index for each of said plurality of pits and each of said plurality of guide grooves such that said optical depth of each of said plurality of pits and each of said plurality of guide grooves is arranged to have a predetermined value by adjusting the respective thickness of portions of said recording film present on each of said plurality of pits and each of said plurality of guide grooves.

5. An optical disc-like recording medium as claimed in claim 4, wherein a width of each of said plurality of pits formed in said ROM region is arranged to be greater by a predetermined value than a width of each of said plurality of guide grooves formed in said RAM region.

6. An optical disc-like recording medium having on one surface of its transparent substrate a ROM region where a plurality of pits are previously formed in correspondence with a predetermined to be recorded information signal and a RAM region where a plurality of guide grooves for tracking are formed and where an information signal can be recorded, a recording film being provided on the entire surface of said transparent substrate, said recording film being made of an organic material and arranged to have a light-absorbing effect to vary its refractive index in response to illumination of laser light with a predetermined wavelength, said recording film having provided thereon a reflection film made of a metal and arranged to reflect light incident thereon, each of said plurality of pits formed in said ROM region having a rectangular cross section and each of said plurality of guide grooves formed in said RAM region also having a rectangular cross section, the respective bottom surfaces of each of said plurality of pits and each of said plurality of guide grooves being substantially situated on a plane parallel to the surface of said transparent substrate, and each of said plurality of pits and each of said plurality of guide grooves having respective optical depths defined by respective products of the physical depth and refractive index of each of said plurality of pits and each of said plurality of guide grooves such that said optical depth of each of said plurality of pits and each of said plurality of guide grooves is arranged to have a predetermined value by adjusting the respective thicknesses of portions of said recording film present on each of said plurality of pits and each of said plurality of guide grooves.

7. An optical disc-like recording medium as claimed in claim 6, wherein said RAM region is formed at a position lower by a predetermined value than said ROM region with respect to said plane including the bottom surfaces of said pits and said guide grooves.

* * * * *

UNITED STATES PATENT AND TRADEMARK OFFICE
CERTIFICATE OF CORRECTION

PATENT NO. : 5,204,852
DATED : April 20, 1993
INVENTOR(S) : Eiji Nakagawa, et. al.

It is certified that error appears in the above-indentified patent and that said Letters Patent is hereby corrected as shown below:

On the Title page, item [54] and col. 1, line 1-3, the invention should read--OPTICAL DISC-LIKE RECORDING MEDIUM AND MANUFACTURING METHOD THEREFOF--.

Signed and Sealed this

Eleventh Day of January, 1994

Attest:

BRUCE LEHMAN

*Attesting Officer*      *Commissioner of Patents and Trademarks*